July 31, 1956 W. H. HOGAN 2,756,964
LIFTING MECHANISM HAVING CLUTCH AND BRAKE
Filed Aug. 17, 1954 2 Sheets-Sheet 1

INVENTOR.
WALTER H. HOGAN
BY
ATTORNEY

July 31, 1956 W. H. HOGAN 2,756,964
LIFTING MECHANISM HAVING CLUTCH AND BRAKE
Filed Aug. 17, 1954 2 Sheets-Sheet 2

INVENTOR.
WALTER H. HOGAN
BY
ATTORNEY

United States Patent Office 2,756,964
Patented July 31, 1956

2,756,964

LIFTING MECHANISM HAVING CLUTCH AND BRAKE

Walter H. Hogan, Olmsted Falls, Ohio, assignor to The Cleveland Pneumatic Tool Company, Cleveland, Ohio, a corporation of Ohio Application August 17, 1954, Serial No. 450,382

1 Claim. (Cl. 254—98)

This invention relates generally to screw jacks and more particularly to a combination ball screw, clutch and brake mechanism which automatically limits rotation of the ball screw in one direction.

Those familiar with the art of ball screws are aware of the fact that because ball screws convert rotational motion to lineal motion in a highly efficient manner, such screws will not maintain a load without rotational restraining means.

A screw jack according to this invention is provided with a single direction clutch means which automatically restrains the ball screw from backing down under load when such backing down is undesirable in combination with brake means capable of connecting or disconnecting the clutch means.

It is an important object of this invention to provide a one direction clutch and brake means to restrain rotational motion of a ball screw which means are adapted to be disconnected when desired.

It is another object of this invention to provide in combination a ball screw and clutch mechanism adapted to limit rotational motion of the ball screw in one direction wherein means are provided to disconnect clutch when freedom of motion in both directions is desired.

It is still another object of this invention to provide a ball screw, a single direction overriding clutch and brake means for connecting and disconnecting the clutch.

Further objects and advantages will appear from the following description and drawings, wherein:

Figure 4 is a fragmentary section showing the position of the elements of the clutch mechanism when the clutch is rotating in the free movement direction; and, Figure 5 is a fragmentary view of the clutch mechanism showing the position the elements assume when the ball screw attempts to rotate in the overriding direction.

A screw jack according to this invention includes a ball screw and nut wherein the nut is arranged to be the load bearing element and the screw is used as a driving element. Attached to the lower end of the screw is a single direction overriding clutch arranged to resist rotation of the screw in the direction which would lower the nut. Brake means are also provided to connect or disconnect the clutch.

Figure 1:
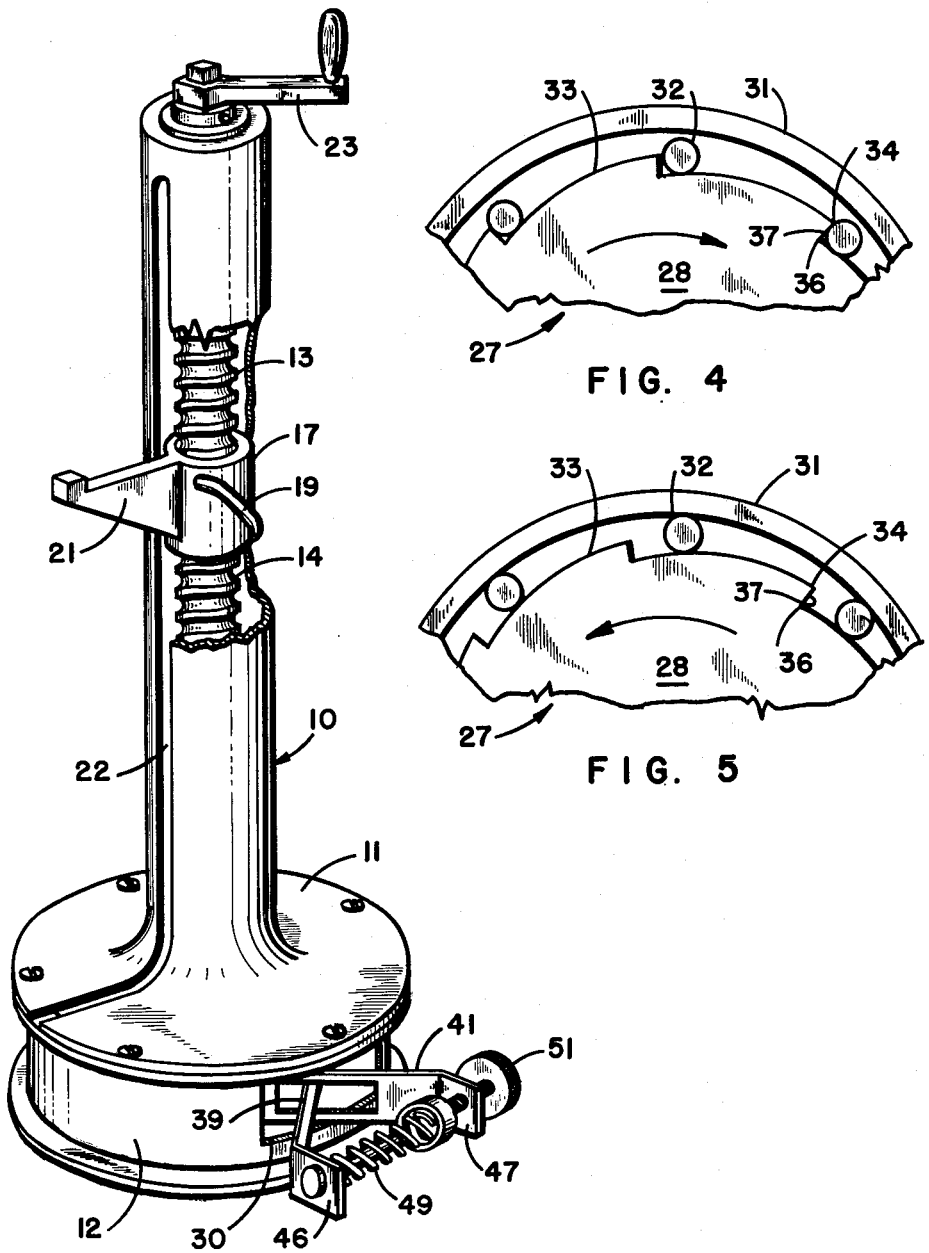
Figure 1 is a perspective view partially in section showing an automobile jack incorporating this invention.
Figure 2:
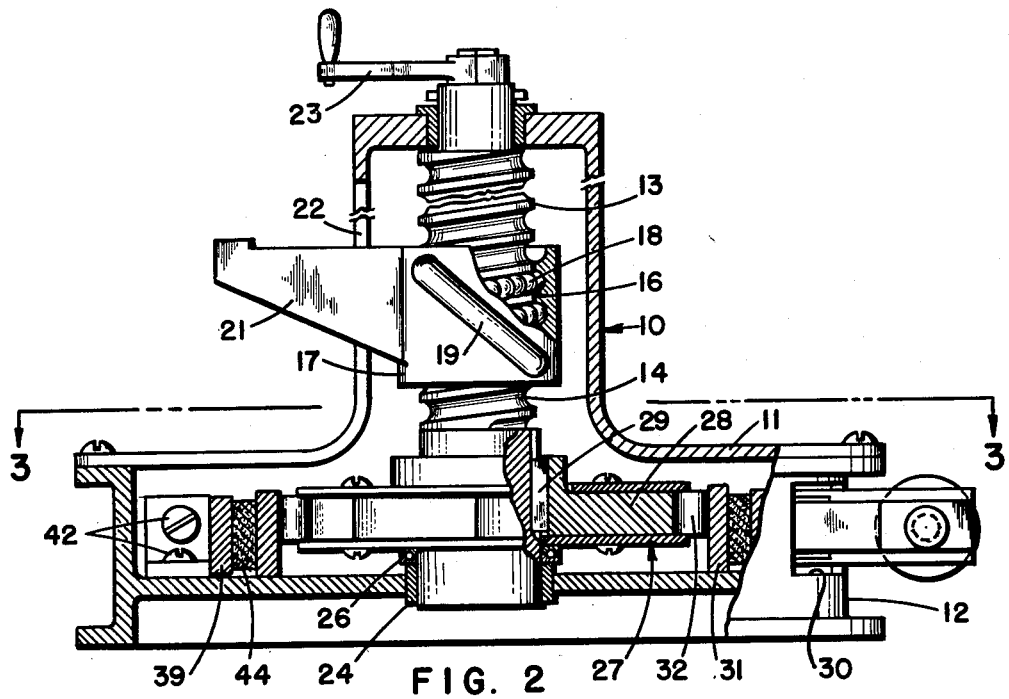
Figure 2 is a side elevation partially in section of the automobile jack shown in Figure 1.

For a clear understanding of this invention reference should be made to the drawings wherein an automobile jack 10 is shown generally in Figure 1. This jack includes a frame or base assembly comprising an upper housing 11 and a lower base housing 12. A screw 13 is vertically positioned within the two housings for rotational motion around its axis. The screw 13 is formed with an external helical groove 14 which cooperates with an internal helical groove 16 formed in a nut 17. The grooves 14 and 16 cooperate to form a helical channel filled with balls 18 which interconnect the screw 13 and the nut 17 in the conventional manner. A return tube 19 is mounted on the nut 17 and provides means for conveying the balls from one end of the nut to the other, so that the nut may be threaded along the screw any desired distance.

The nut 17 is provided with a laterally projecting load arm 21 which projects out through a vertical slot 22 in the upper housing 11 and is arranged to engage a load such as an automobile bumper or the like. The load arm 21 in combination with the vertical slot 22 cooperate to provide means for limiting rotational motion of the nut 17 while permitting the nut to move vertically along the screw 13. A crank handle 23 is mounted on the upper end of the screw 13 and provides means for rotating the screw, and a journal 24 at the lower end of the screw 13 is arranged with a thrust bearing 26 to support the screw against vertical loads which are assumed by the load arm 21.

Mounted on the lower end of the screw 13 adjacent to the thrust bearing 26 is an overriding clutch 27 which comprises a driving member 28 keyed to the screw by the key 29 and a ring shaped driven member 31 interconnected with the driving member by the cylindrical rollers 32.

The periphery of the driving member 28 is formed with a plurality of symmetrically located camming surfaces 33 which converge with the inner surface of the driven member 31, the rate of convergence being arranged to provide a locking angle for the cylindrical rollers 32. The outer end 34 of the camming surfaces 33 is spaced from the inner surface of the driven member 31 a distance less than the diameter of the rollers 32 and the inner end 36 of the camming surfaces 33 is spaced from the inner surface of the driven member 31 a distance greater than the diameter of the rollers 32. A substantially radial wall 37 joins the inner end 36 of one camming surface with the outer end 34 of the adjacent camming surface and a roller 32 is provided for each of the camming surfaces.

Figure 3:
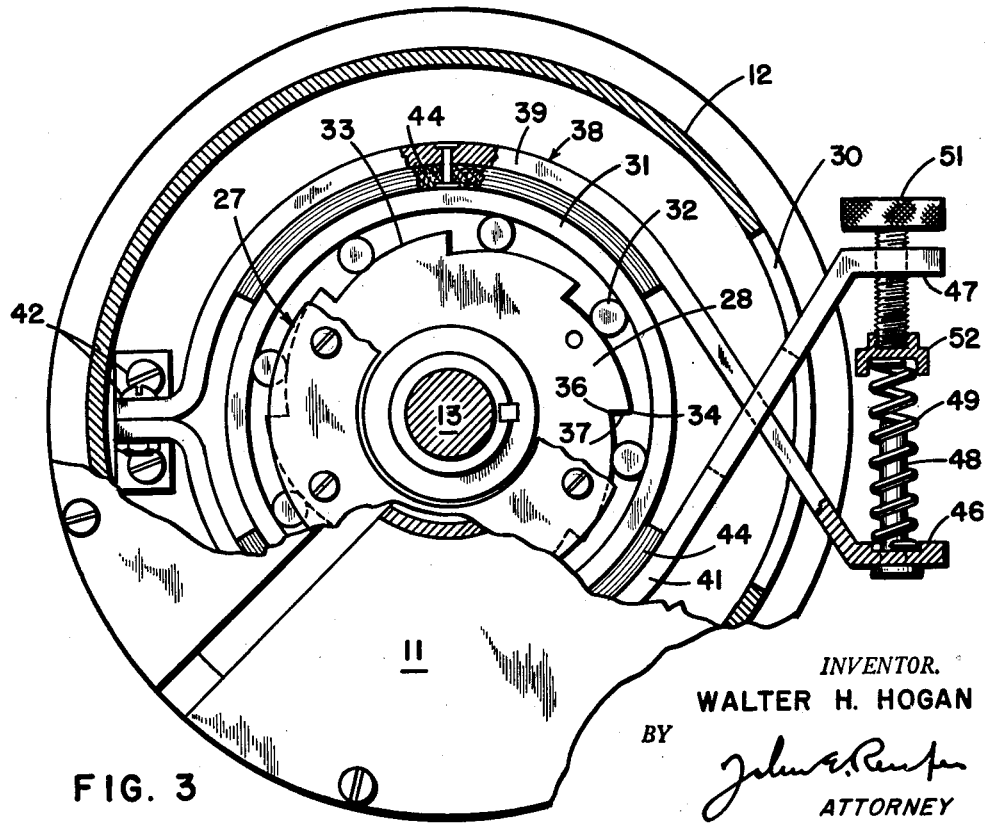
Figure 3 is a plan view partially in section of the clutch and brake mechanism according to this invention.

In operation, rotation of the driving member 28 in the clockwise direction as shown in Figure 4 will cause the rollers 32 to roll along the camming surface 33 until they are adjacent to the radial wall 37 at which time the driving member 28 is free to rotate relative to the driven member 31. If, however, the driving member 28 is urged toward rotation in the counter-clockwise direction as shown in Figures 3 and 5, the rollers 32 roll outwardly along the camming surfaces 33 until they engage the driven member 31. At this time a locking engagement occurs which prevents any further rotation of the driving member relative to the driven member.

A brake shown generally at 38 is arranged to engage the driven member 31 and limit rotation thereof relative to the lower housing 12. This brake includes two symmetrically opposed brake bands 39 and 41, the inner ends of which are mounted on the lower housing 12 by screw fasteners 42. The outer ends of the bands 39 and 41 extend through an opening 30 provided in the wall of the lower housing 12 opposite the screw fastener 42 and are arranged to cross in the manner best illustrated in Figure 3. A brake lining 44 is mounted on each band 39 and 41 and is adapted to engage the outer surface of the driven member 31 to provide frictional engagement between the brake and the driven member when the brake is applied.

The extreme outer ends of the brake bands 39 and 41 are formed with portions 46 and 47 which are in an opposed parallel relationship relative to each other. Mounted on the portion 46 is a spring guide 48 which projects into a coil spring 49 and mounted on the portion 47 is a screw 51 which may be threaded axially relative thereto. The spring 49 abuts against the projecting portion 46 at one end and against a cap 52 on the screw 51 at the other end. Because the brake bands 39 and 41 cross, forces urging the portions 46 and 47 apart bring the brake linings 44 into firm engagement with the driven member 31. Threading the screw 51 axially relative to the portion 47 toward the portion 46 compresses the spring 49 which in turn urges the portions 46 and 47 apart and applies the brake. Conversely, threading of the screw 51 in the opposite direction releases the compression on the spring 49 and loosens the brake bands 39 and 41 thereby releasing the brake. It is apparent, therefore, that the brake serves to releasably connect the overriding clutch 27 to the housing 12 when it is desired to bring the clutch into operation.

The grooves 14 and 16 are arranged so that a normal load carried by the nut 17 tends to rotate the screw 13 in the direction which is the lock up direction of the overriding clutch 27 so that a load can be carried at any desired height by the jack when the brake is engaged. In operation the screw 51 is threaded toward the portion 46 until the brake is applied before the jack is loaded. The screw 13 is then rotated in the clockwise direction, which is the free running direction of the clutch 27, until the load such as an automobile is raised to the desired height. The jack will then support the load at the desired height since the load tends to cause the screw to rotate in the counter-clockwise direction which rotation is prevented by the overriding clutch 27 and the brake 38. When it is desired to lower the load, it is merely necessary to ease the brake engagement by rotating the screw 51 so that it moves away from the portion 46. As soon as the brake engagement is reduced to a point where the torque on the screw 13 created by the load is greater than the torque absorbed by the brake 38, the screw 13 and the entire overriding clutch mechanism will rotate in the counter-clockwise direction and the load will be lowered. Because the engagement of the brake 38 can be accurately controlled by the screw 51, it is possible to adjust the brake engagement so that the load may be lowered at any desired controlled rate. In normal operation of the jack, the brake will not be completely released but rather the engagement of the brake will be adjusted to either prevent the screw from rotating under the load or to permit the screw to rotate slowly to lower the load in a controlled fashion. A screw jack according to this invention therefore provides an automatic clutch for limiting rotational movement of the screw in one direction while providing means for manually controlling the automatic operation so that the screw can rotate in both directions.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description are determinative of the scope of the invention.

I claim:

In a device of the character described, a housing having an enlarged hollow base portion at its lower end, a screw vertically mounted in said housing for rotation while being axially fixed relative thereto, crank means on the upper end of said screw for rotating it, a cooperating nut on said screw axially movable relative thereto upon relative rotation therebetween, a laterally extending load arm on said nut projected through an axially extending slot formed in said housing preventing rotation of said nut relative to said housing while permitting axial motion relative thereto, a driving member rotationally fixed on the lower end of said screw within said base portion, a driven member around said driving member, locking members between said driving and driven members preventing relative rotation therebetween in one direction and permitting free relative rotation in the other direction, brake members rotationally fixed in said base portion engageable with said driven member to resist rotation thereof relative to said base, operating means providing adjustment of said brake members for controllably changing the engagement between said brake members and driven member to adjust the amount of torque necessary to produce rotation of said driven member relative to said brake members whereby an axial load supported by said arm may be maintained in any desired position or allowed to move under the force of a load at a controlled rate.

References Cited in the file of this patent

UNITED STATES PATENTS

| | | |
|---|---|---|
| 1,706,710 | Selden | Mar. 26, 1929 |
| 2,267,524 | Hawkins | Dec. 23, 1941 |